US007045481B1

(12) United States Patent  (10) Patent No.: US 7,045,481 B1
Parasher et al.  (45) Date of Patent: May 16, 2006

(54) NANOCATALYST ANCHORED ONTO ACID FUNCTIONALIZED SOLID SUPPORT AND METHODS OF MAKING AND USING SAME

(75) Inventors: Sukesh Parasher, Lawrenceville, NJ (US); Michael Rueter, Plymouth Meeting, PA (US); Bing Zhou, Cranbury, NJ (US)

(73) Assignee: Headwaters Nanokinetix, Inc., Lawrenceville, NJ (US)

( * ) Notice: Subject to any disclaimer, the term of this patent is extended or adjusted under 35 U.S.C. 154(b) by 0 days.

(21) Appl. No.: 11/103,824

(22) Filed: Apr. 12, 2005

(51) Int. Cl.
*B01J 31/00* (2006.01)
(52) U.S. Cl. ............. 502/150; 502/117; 502/103; 502/102; 502/113; 502/115; 502/118; 502/121; 502/125; 502/126; 526/124.3; 526/346
(58) Field of Classification Search ............. 502/117, 502/103, 102, 113, 115, 118, 121, 125, 126, 502/150; 526/124.3, 346
See application file for complete search history.

(56) References Cited

U.S. PATENT DOCUMENTS

| | | | |
|---|---|---|---|
| 3,907,852 A * | 9/1975 | Oswald et al. ............. 556/404 |
| 4,083,803 A | 4/1978 | Oswald et al. | |
| 4,128,627 A | 12/1978 | Dyer et al. | |
| 4,148,750 A | 4/1979 | Pine | |
| 4,169,014 A * | 9/1979 | Goldberg ............. 435/182 |
| 4,279,883 A | 7/1981 | Izumi et al. | |
| 4,313,806 A | 2/1982 | Dalton, Jr. et al. | |
| 4,335,092 A | 6/1982 | Dalton, Jr. et al. | |
| 4,336,238 A | 6/1982 | Dalton, Jr. et al. | |
| 4,336,239 A | 6/1982 | Dalton, Jr. et al. | |
| 4,336,240 A | 6/1982 | Moseley et al. | |
| 4,347,231 A | 8/1982 | Michaelson | |
| 4,347,232 A | 8/1982 | Michaelson | |
| 4,366,085 A | 12/1982 | Ikegami et al. | |
| 4,369,128 A | 1/1983 | Moseley et al. | |
| 4,374,758 A * | 2/1983 | Sasaki et al. ............. 502/215 |
| 4,379,778 A | 4/1983 | Dalton, Jr. et al. | |
| 4,661,337 A | 4/1987 | Brill | |
| 4,681,751 A | 7/1987 | Gosser | |
| 4,826,795 A | 5/1989 | Kitson et al. | |
| 4,832,938 A | 5/1989 | Gosser et al. | |
| 4,889,705 A | 12/1989 | Gosser | |
| 4,996,039 A | 2/1991 | Pralus et al. | |
| 5,128,114 A | 7/1992 | Schwartz | |
| 5,132,099 A | 7/1992 | Hiramatsu et al. | |
| 5,180,573 A | 1/1993 | Hiramatsu et al. | |
| 5,236,692 A | 8/1993 | Nagashima et al. | |
| 5,320,821 A | 6/1994 | Nagashima et al. | |
| 5,338,531 A | 8/1994 | Chuang et al. | |
| 5,352,645 A | 10/1994 | Schwartz | |
| 5,378,450 A | 1/1995 | Tomita et al. | |
| 5,393,724 A * | 2/1995 | Okajima et al. ............. 502/402 |
| 5,480,629 A | 1/1996 | Thompson et al. | |
| 5,496,532 A | 3/1996 | Monzen et al. | |
| 5,670,580 A * | 9/1997 | Tazaki et al. ............. 525/240 |
| 5,846,895 A | 12/1998 | Gila et al. | |
| 5,846,898 A | 12/1998 | Chuang et al. | |
| 5,925,588 A | 7/1999 | Chuang et al. | |
| 5,961,948 A | 10/1999 | Wanngard | |
| 5,965,101 A | 10/1999 | Goto et al. | |
| 5,972,305 A | 10/1999 | Park et al. | |
| 5,976,486 A | 11/1999 | Thompson et al. | |
| 5,998,328 A * | 12/1999 | Dawes et al. ............. 502/182 |
| 6,054,507 A | 4/2000 | Funaki et al. | |
| 6,090,858 A | 7/2000 | El-Sayed | |
| 6,106,797 A | 8/2000 | Muller et al. | |
| 6,117,409 A | 9/2000 | Bertsch-Frank et al. | |
| 6,127,307 A | 10/2000 | Muller et al. | |
| 6,159,267 A | 12/2000 | Hampden-Smith | |
| 6,168,775 B1 | 1/2001 | Zhou et al. | |
| 6,194,338 B1 | 2/2001 | Andolfatto et al. | |
| 6,210,651 B1 | 4/2001 | Nystrom et al. | |
| 6,284,213 B1 | 9/2001 | Paparatto et al. | |
| 6,297,180 B1 * | 10/2001 | Maier ............. 501/12 |
| 6,299,852 B1 | 10/2001 | Nystrom et al. | |
| 6,342,191 B1 * | 1/2002 | Kepner et al. ............. 423/210 |
| 6,518,217 B1 | 2/2003 | Xing et al. | |
| 6,528,683 B1 | 3/2003 | Heidemann et al. | |

(Continued)

FOREIGN PATENT DOCUMENTS

EP 0 978 316 2/2000

(Continued)

OTHER PUBLICATIONS

Ahmadi, et al., "Shape-Controlled Synthesis of Colloidal Platinum Nanoparticles" *Science*, vol. 272, pp. 1924-1926 (Jun. 28, 1996).

(Continued)

*Primary Examiner*—J. A. Lorengo
*Assistant Examiner*—Jennine Brown
(74) *Attorney, Agent, or Firm*—Workman Nydegger

(57) ABSTRACT

Supported catalysts include a solid support such as silica that is functionalized to have inorganic acid functional groups attached thereto. Active catalyst particles are supported on the functionalized support material. The acid functionalized support material is made by reacting a solid support with an inorganic acid containing agent such as sulfuric acid or para-toluene sulfonic acid. An organic anchoring agent is used to form and anchor catalyst nanoparticles to the acid functionalized support material. The supported catalyst can be sized and shaped for use in any type of reactor, including a fixed bed or fluidized bed reactor. The methods of the present invention also include a process for the direct synthesis of hydrogen peroxide using the supported catalyst.

29 Claims, No Drawings

U.S. PATENT DOCUMENTS

| | | | |
|---|---|---|---|
| 6,534,661 | B1 | 3/2003 | Zhou et al. |
| 6,551,960 | B1 | 4/2003 | Laine et al. |
| 6,630,118 | B1 | 10/2003 | Paparatto et al. |
| 6,649,140 | B1 | 11/2003 | Paparatto et al. |
| 6,676,919 | B1 * | 1/2004 | Fischer et al. .............. 423/584 |
| 6,740,615 | B1 | 5/2004 | Zhou |
| 6,746,597 | B1 | 6/2004 | Zhou et al. |
| 6,872,681 | B1 * | 3/2005 | Niu et al. ................... 502/101 |
| 2003/0215383 | A1 | 11/2003 | Escrig et al. |
| 2004/0013601 | A1 | 1/2004 | Butz et al. |
| 2004/0037770 | A1 | 2/2004 | Fischer et al. |
| 2004/0081611 | A1 | 4/2004 | Muller et al. |
| 2004/0184983 | A1 | 9/2004 | Paparatto et al. |
| 2004/0241502 | A1 | 12/2004 | Chung et al. |

FOREIGN PATENT DOCUMENTS

| | | |
|---|---|---|
| JP | 10324507 | 12/1998 |
| JP | 10330103 | 12/1998 |
| WO | WO 02/83550 | 10/2002 |

OTHER PUBLICATIONS

Li, et al., "Carbon Nanotubes as Support for Cathode Catalyst of a Direct Methanol Fuel Cell", *Letters to the Editor/Carbon 40*, Dalian University of Technology, pp. 787-803 (Jan. 18, 2002).

Li, et al., "Preparation and Characterization of Multiwalled Carbon Nanotube-Supported Platinum for Cathode Catalysts of Direct Methanol Fuel Cells", *J. Phys. Chem*, B, vol. 107, pp. 6292-6299 (Jun. 6, 2003).

Lordi, et al., "Method for Supporting Platinum on Single-Walled Carbon Nanotubes for a Selective hydrogenation Catalyst", *Chem. Mater.*, vol. 13, pp. 733-737 (Feb. 10, 2001).

Zhou, et al., "Novel Synthesis of Highly Active Pt/C Cathode Electrocatalyst for Direct Methanol Fuel Cell" Chem. Commun. 2003, pp. 394-395.

Zhou, et al. "Preparation and Characterization of Anode Catalysts PtRu/C for Direct Methanol Fuel Cells" Chemical Journal of Chinese Universities, vol. 24, 2003, pp. 885-862.

* cited by examiner

NANOCATALYST ANCHORED ONTO ACID FUNCTIONALIZED SOLID SUPPORT AND METHODS OF MAKING AND USING SAME

BACKGROUND OF THE INVENTION

1. The Field of the Invention

The present invention relates generally to supported catalysts and methods for making and using such catalysts (e.g., in the direct synthesis of hydrogen peroxide). The support material is functionalized with an inorganic acid functional group to improve the bonding of the catalyst to the support.

2. The Related Technology

Hydrogen peroxide is a commercially important product which is widely used in the textile industry, paper industry, and chemical industry as a bleaching agent, biocide, and chemical reagent. Traditionally hydrogen peroxide has been manufactured through a process which includes multiple oxidation and reduction steps using alkylanthraquinones. This process is complicated and expensive because of the many steps involved, the large volumes of reagents, the relatively high cost of intermediates, and the production of inactive by-products.

Recently, efforts have been made to develop an alternative process whereby hydrogen peroxide is directly synthesized from hydrogen and oxygen using precious metal catalysts. The direct synthesis of hydrogen peroxide offers significant economic advantages because it avoids making intermediate products and does not need the use of reagents such as alkylanthraquinones.

One important aspect of a direct synthesis process is the catalyst, which must be able to selectively convert hydrogen and oxygen to hydrogen peroxide, with minimal production of water, a competing by-product that is thermodynamically favored over hydrogen peroxide. In general, catalysts for the direct synthesis reaction use palladium or a combination of palladium and platinum, as the active catalyst. These catalysts are generally used in the form of small particles dispersed on a solid catalyst support. Typically the support is a carbon-based material such as activated carbon.

Because of the high cost of the active catalyst metals, the metals need to be used efficiently and should be recoverable. Most existing direct synthesis processes use catalysts supported on a carbon-based powder and are used in a slurry-type reactor. The carbon powder catalyst is typically recovered from the liquid slurry using very efficient, but costly, filtration systems.

One disadvantage with slurry-type reactors is that they require continuous mixing. The continuous mixing increases attrition of the metal particles from the support. Metal particles that separate from the support are too fine to be recovered in the filtration process and are thus unrecoverable.

Another disadvantage of existing direct synthesis systems is the use of carbon as a support for the catalyst material. Carbon-based materials can degrade over time and/or combust in a high oxygen environment. The direct synthesis of hydrogen peroxide typically requires an oxygen feedstream. To avoid undesirable interaction between the oxygen feed stream and the carbon support, existing systems restrict the concentration of oxygen in the overall feed.

Therefore, what is needed is an improved supported catalyst that is efficient, better avoids attrition and leaching, and/or is more stable in a high oxygen environment.

BRIEF SUMMARY OF THE INVENTION

The present invention is directed to an efficient and easily recoverable supported catalyst. The improved supported catalyst includes a solid support material that is functionalized to have inorganic acid functional groups attached thereto. A catalyst material such as active noble metal particles are supported on the functionalized support material. The acid functionalized groups provide reactive sites where catalyst atoms can be attached or bonded to the support. The novel supported catalysts of the present invention are particularly advantageous for the direct synthesis of hydrogen peroxide. In an exemplary embodiment, the supported catalyst is used in a fixed bed or ebullated bed to manufacture hydrogen peroxide.

The support material can be any solid support material suitable for supporting nanoparticle catalysts. The support material includes surface functional groups that can react with an acid to create inorganic acid functional groups on the support material. In a preferred embodiment, the support material is a metal oxide. Examples of suitable metal oxides include silica, alumina, natural and synthetic zeolites, among others.

In an exemplary embodiment, the inorganic acid functional group is a sulfonic, nitric, phosphonic or chloride group. Sulfonic groups are particularly advantageous for making supported catalyst for use in manufacturing hydrogen peroxide. Catalysts manufactured with sulfonic groups have been found to be more stable and less prone to leaching of the precious metal catalyst when used for the direct synthesis of hydrogen peroxide. In many cases, functionalization can occur in a single step using one type of acid.

In one embodiment, the acid functional group is formed on the support material in two or more steps. In an exemplary embodiment, the metal oxide support is activated with a first agent such as a hydrogen halide to form an intermediate functionalized support material. The intermediate functionalized support material is then reacted with an inorganic acid containing agent to form the inorganic acid functional group on the support. Two or more steps are typically used where the surface groups of the support material are not sufficiently reactive for carrying out a reaction with a particular inorganic acid.

Any catalyst material can be supported on the support material of the present invention. In an exemplary embodiment, the catalyst material is a dispersion of noble metal nanoparticles. Suitable noble metals include palladium, platinum, iridium, ruthenium, rhodium, gold, and combinations of these. Palladium, platinum, and combinations thereof are particularly preferred for the direct synthesis of hydrogen peroxide from hydrogen and oxygen due to the high efficiency of these metals for this particular application. The present invention is particularly suited for precious metal supported catalyst because of the need to recover spent catalyst and to improve catalyst efficiency and longevity.

In an exemplary embodiment, the catalyst material is dispersed and/or anchored to the functionalized support material using an organic agent (e.g., an organic molecule, oligomer, or polymer). The organic agent advantageously includes one or more functional groups that can bind with the metal particles and one or more functional groups that can bind to the support material.

The present invention is particularly advantageous when used with metal oxides for the support material. Metal oxides often lack adequate bonding sites for anchoring a catalyst as compared with other support materials. Providing acid functionalization compensates for the initial lack of bonding sites.

Another benefit of metal oxide supports is the ability to shape the support to have a desired shape. For example, metal oxides used to support the catalyst particles can be shaped into granules, spheres, extruded shapes, powders, or other desired forms to suit a particular application. Thus the supported catalysts of the present invention can be used in many different types of reactors, including fixed bed reactors, ebullated bed reactors, and slurry-type reactors (e.g., owing to their generally larger size).

In a preferred embodiment of the invention, the supported catalysts are used in a fixed bed or an ebullated bed reactor to reduce the risks of attrition of the metal from the support material. In addition to improved longevity, supported catalysts used in a fixed bed or ebullated bed are more easily recovered than are catalyst used in a slurry-type reactor.

Another advantage of using metal oxide supports is the incombustibility of the support material. Because metal oxides do not react with oxygen, the supported catalysts of the present invention can be used in conditions with higher oxygen concentrations as compared to conditions for using carbon-based supported catalysts. In hydrogen peroxide production, for example, the oxygen concentration in the feed stream can be optimized for production of hydrogen peroxide without concern for the combustion or reaction of the oxygen with the support material. In general, increasing the ratio of oxygen to hydrogen favors formation of hydrogen peroxide over water.

These and other advantages and features of the present invention will become more fully apparent from the following description and appended claims as set forth hereinafter.

DETAILED DESCRIPTION OF EXEMPLARY EMBODIMENTS

The present invention is directed to the manufacture of novel supported catalysts. The novel catalysts include a solid support material that is functionalized with inorganic acid functional groups. The acid functionalized support material serves as a support for a metal nanoparticle catalyst. The nanocatalyst particles are anchored to the support material through an organic molecule, oligomer, or polymer having functional groups that can bind to both the nanocatalyst particles and to the support material. The present invention is also directed to methods of using the supported catalysts to directly synthesize hydrogen peroxide from hydrogen and oxygen feed streams.

For purposes of this invention, the term "nanoparticles" or "nano-sized particles," means particles with a diameter of less than about 100 nanometers (nm).

I. Components Used to Manufacture Supported Catalysts and Intermediates

Supported catalysts according to the invention are typically manufactured using a metal oxide support material, an inorganic acid, a plurality of catalyst atoms and an organic anchoring agent. As will be discussed more fully below, the support material is reacted with the inorganic acid to form an acid functionalized support material. A nanoparticle catalyst is anchored to the support through the anchoring agent.

A. Support Materials

Any solid support material known to those skilled in the art as useful catalyst supports can be used as supports for the nanocatalyst particles of this invention. The support may be in a variety of physical forms. It may be either porous or non-porous. It may be 3-dimensional structures such as a powder, granule, tablet, extrudates, or the like. Supports may also be in the form of 2-dimensional structures such as films, membranes, coatings, or 3-dimensional structures having mainly 2-dimenional surfaces.

In an exemplary embodiment, the support includes a metal oxide. These include, but are not limited to, silica (including silica gel, fused silica, fumed silica, quartz, and the like), alumina, titania, zirconia, magnesia, kieselguhr, diatomaceous earth, bentonite, clay, as well as the oxides of various other metals, alone or in combination. They also include the class of porous solids collectively known as zeolites, natural or synthetic, which have ordered porous structures. For purposes of this invention the element "silicon" is considered a metal and "silicon dioxide" is a metal oxide.

Another useful class of supports includes carbon-based materials, such as carbon black, activated carbon, graphite, fluoridated carbon, and the like. Other useful classes of support materials include organic solids, such as polymers and metals and metal alloys. Flammable supports should be used under suitable conditions that will not ignite or unduly degrade the support material.

In a preferred embodiment, the metal oxide component is greater than about 50% by weight of the support material, more preferably greater than about 75%, and even more preferably greater than about 90% by weight. In a most preferred embodiment, the metal oxide comprises at least 90% silica gel.

Typically, the support material includes hydroxyl or other functional groups on the surface of the support material that can be used to functionalize the support material with an inorganic acid. As discussed more fully below, in some cases, the surface of the support material is first activated such that the support material will bond to the inorganic acid containing compound.

In an exemplary embodiment, the support material has a high surface area for supporting a dispersed catalyst material. In a preferred embodiment, the surface area is between about 50 $m^2/g$ and about 1000 $m^2/g$. In a more preferred embodiment, the surface area is between about 100 $m^2/g$ and about 500 $m^2/g$.

Another feature of preferred support material is their ability to be manufactured into almost any desired shape and/or size. Because the catalyst of the present invention can be made from metal oxides such as silica and alumina, the catalyst can be shaped using methods known in the art. For example, the metal oxide can be manufactured into any sized or shaped granules, beads, extrudates, spheres, powders, and similar shapes.

The support material can include additional components to give the support material desired properties and/or to assist forming the support material into a desired size or shape. Examples of other components include binders, lubricants, and extrusion aids.

B. Inorganic Acid Containing Compound

The inorganic acid containing compound is a compound capable of reacting with the support material, or a prefunctionalized intermediate thereof, to form an acid functionalized support material. The inorganic acid containing compound can be an inorganic compound or an organic compound so long as the compound includes an inorganic acid functional group that can bond to the support or intermediate support. Suitable inorganic acid functional groups include sulfonic groups, nitric groups, phosphonic groups, and the like.

For purposes of this invention, sulfonic groups, nitric groups, and phosphonic groups include functional groups that are derivatives of sulfuric acid, nitric acid, and phosphoric acid, respectively, so long as the derivative based functional group is capable of bonding to the support or intermediate support. The term sulfonic group includes, but is not limited to, functional groups with an $SO_3$ group whether in the ground state or in ionic form. $SO_3$ functional groups include sulfonates, sulfamates, sulfites, bisulfites, sulfonic acid, salts and esters of these, sulfonyl halides, and the like. The term "sulfonic group" shall also include sulfates and bisulfates. Nitric groups and phosphonic groups also include derivative based functional groups corresponding to their respective acids.

The inorganic acid containing compound can be an inorganic acid such as sulfuric acid, sulfamic acid, nitric acid, phosphoric acid, salts and esters of these, or the like. Alternatively, the inorganic acid containing compound can be an organic compound that includes an inorganic acid functional group. Such compounds include organic sulfonic acids such as para-toluene sulfonic acid (p-TSA), dodecylbenzene sulfonic acid, methane sulfonic acid, 2,4 dinitrobenzene sulfonic acid, 3 hydroxypropane-1-sulfonic acid, 6-aminotoluene-3-sulfonic acid, 2-amino-1-naphthalenesulfonic acid, diphenylamine-4-sulfonic acid, p-xylene-2-sulfonic acid, salts and esters of these, and similar compounds.

C. Catalyst Atoms

The catalyst atoms that form the nanocatalyst particles of the present invention include one or more noble metals, base transition metals, rare earth metals, alkaline earth metals, earth metals or non metals. In an exemplary embodiment, the catalyst atoms include at least one noble metal. Noble metals include platinum, palladium, iridium, gold, osmium, ruthenium, rhodium, and rhenium.

For direct synthesis of hydrogen peroxide, the catalysts are selected to provide optimal catalytic performance in a direct hydrogen peroxide manufacturing process. In an exemplary embodiment, the catalyst atoms include palladium, platinum and combinations thereof.

As described below, the catalyst atoms are added to an appropriate solvent or carrier to form a suspension or solution. Catalyst atoms can be added to a solution in elemental (i.e. metallic) or ionic form. Typically, the catalyst atoms are added in ionic form so as to more readily dissolve or disperse within the solvent or carrier.

Ionic metal atoms are typically added in the form of a metal salt. Examples of suitable ionic forms include metal halides, nitrates or other appropriate salts that are readily soluble in a solvent or carrier. Other examples include metal phosphates, sulfates, tungstates, acetates, citrates, and glycolates.

Metal components that are compounds themselves, such as oxides, can be added to a liquid medium in the appropriate compound form, or may be in a different chemical form that is converted to the appropriate chemical form during nanoparticle formation.

D. Anchoring Agent

The anchoring agent is an organic molecule that can bond with atoms of the catalyst nanoparticles and also to the support material such that the anchoring agent tethers the nanocatalyst particles to the support material. Exemplary anchoring agents are able to interact and complex with catalyst atoms dissolved or dispersed within an appropriate solvent or carrier through various mechanisms, including ionic bonding, covalent bonding, Van der Waals interaction/bonding, or hydrogen bonding. Anchoring agents within the scope of the invention include a variety of small organic molecules, as well as polymers and oligomers.

To provide bonding between the anchoring agent and the catalyst atoms, the anchoring agent includes one or more appropriate functional groups. Suitable functional groups for bonding the anchoring agent with the catalyst atoms include one or more of a hydroxyl, a carboxyl, a carbonyl, an amine, a thiol, a sulfonic acid, a sulfonyl halide, an acyl halide, and combinations of these. The anchoring agent can be monofunctional, bifunctional, or polyfunctional.

Examples of suitable monofunctional anchoring agents include alcohols such as ethanol and propanol and carboxylic acids such as formic acid and acetic acid. Useful bifunctional anchoring agents include diacids such as oxalic acid, malonic acid, maleic acid, and the like; dialcohols such as ethylene glycol, propylene glycol, 1,3-propanediol, and the like; and hydroxy acids such as glycolic acid, lactic acid, and the like. Useful polyfunctional anchoring agents include sugars such as glucose, polyfunctional carboxylic acids such as citric acid, oxalic acid, hydroxy diacids, and the like.

Other useful anchoring agents include ethanolamine, mercaptoethanol, 2-mercaptoacetate, amino acids such as glycine and alanine, sulfonic acids such as sulfobenzyl alcohol and sulfobenzoic acid, and other sulfobenzyl compounds having amino and thiol functional groups.

Exemplary anchoring agents according to the invention also include polymers or oligomers, which can be natural or synthetic. In the case where the anchoring agent is an oligomer or polymer, the molecular weight, measured in number average, is preferably in a range from about 300 to about 15,000 Daltons, more preferably in a range of about 600 to about 6000 Daltons. However, it is recognized that even high molecular weight polymers, i.e., greater than 15,000, can be used as the anchoring agent if they are readily soluble in solvents, carriers or vehicles and can complex with the catalyst atoms.

The molecular weight of the polymer or oligomer molecules may be selected to yield an anchoring agent having a desired number of functional groups per molecule. In general, the number of functional groups may range from 4 to 200 functional groups per molecule, preferably from about 8 to about 80 functional groups, and more preferably from about 10 to about 20 functional groups. In many cases, the number of functional groups within a polymer or oligomer at least approximately corresponds to the number of repeating units. It is also possible to reduce or minimize branching by selecting a polymer or oligomer having fewer repeating units, e.g., fewer than 20.

Suitable polymers and oligomers within the scope of the invention include, but are not limited to, polyacrylic acid, polyacrylates, polyvinylbenzoates, polyvinyl sulfate, polyvinyl sulfonates, including sulfonated styrene, polybisphenol carbonates, polybenzimidizoles, polypyridine, sulfonated polyethylene terephthalate. Other suitable polymers include polyvinyl alcohol, polyethylene glycol, polypropylene glycol, and the like.

E. Solvents and Carriers

A solvent or carrier can be used as a vehicle for the combining of the catalyst atoms (typically in the form of an ionic salt) and/or the dispersing agent. The solvent used to make the inventive precursor compositions may be an organic solvent, water or a combination thereof. Organic solvents that can be used include alcohols, ethers, glycols, ketones, aldehydes, nitrites, and the like.

Preferred solvents are liquids with sufficient polarity to dissolve the metal salts. These preferred solvents include water, methanol, ethanol, n-propanol, isopropyl alcohol, acetonitrile, acetone, tetrahydrofuran, ethylene glycol, dimethylformamide, dimethylsulfoxide, methylene chloride, and the like, including mixtures thereof.

Other chemical modifiers may also be included in the liquid mixture. For example, acids or bases may be added to adjust the pH of the mixture. Surfactants may be added to adjust the surface tension of the mixture, or to stabilize the nanoparticles.

The solvent for the nanoparticle components may be a neat solvent, but it is preferable to use an acidic solution, as acids aid in the dissolution of the nanoparticle components. The solution may be acidified with any suitable acid, including organic and inorganic acids. Preferred acids include mineral acids such as sulfuric, phosphoric, hydrochloric, nitric, and the like, or combinations thereof. While it is possible to use an acid in a wide range of concentrations, it is generally only necessary to use relatively dilute solutions to accomplish a desired solubility enhancement.

II. Methods of Making Supported Catalyst

The process for manufacturing supported catalysts according to the present invention can be broadly summarized as including the following steps: (i) a support material and an inorganic acid are reacted to form an inorganic acid functionalized support material; (ii) one or more types of catalyst atoms and one or more types of anchoring agents are reacted or combined together to form a catalyst complex, or in some cases nanocatalyst particles; and (iii) the anchoring agent or the catalyst complex is bonded to the acid functionalized support material to provide a tether for anchoring the nanocatalyst particles to the acid functionalized support material. It should be understood that steps (ii) and (iii) can be performed in any order.

A. Manufacturing Inorganic Acid Functionalized Support Materials

The inorganic acid functionalized support material is made by reacting one or more inorganic acid containing compounds with a support material. The inorganic acid containing compound reacts with hydroxyl or other functional groups on the surface of the support material such that the acid group is bonded to the support material. The inorganic acid groups are more reactive to nanocatalyst particles and compounds for anchoring, tethering, or otherwise supporting a catalyst nanoparticle.

The acid functionalized support material can be created in a single step or alternatively in two or more steps. In a single step process, the inorganic acid containing compound is sufficiently reactive with the support material such that the inorganic acid containing compound will react and bond to the support material. An example of an inorganic acid containing agent suitable for use in a single step process is para-toluene sulfonic acid.

In an alternative embodiment, the acid functionalized support material is manufactured in a two step process. In this embodiment, the support material is first reacted with an activating agent to make the support more reactive to the inorganic acid containing compound, thus forming an intermediate functionalized support material.

The activating agent can be any compound that will react with the surface of the support to make the surface of the support more reactive to an inorganic acid containing compound. In an exemplary embodiment, the activating agent is a hydrogen halide, such as HF, HCl, or HBr. Typically, reacting the inorganic acid containing compound (e.g. sulfuric acid) with the intermediate functionalized support results in the activating agent being lost from the intermediate support.

Once the inorganic acid functional groups have been bonded to the support material, the functionalized support can be washed to remove traces of unreacted chemicals. For example, the functionalized support can be washed with water or organic solvent.

Other optional treatment steps can also be performed on the acid functionalized support. For example, the acid functionalized support can be soaked in a solvent such as methanol, ethanol, or the like. Optionally the functionalized support can also be dried.

B. Forming Nanocatalyst Particles

The anchoring agent is reacted with one or more types of catalyst atoms to form a supported nanoparticle catalyst. The nanocatalyst particles are generally formed by first dissolving the catalyst atoms and the anchoring agent in an appropriate solvent or carrier and allowing the catalyst atoms to recombine as a catalyst complex so as to form a solution or suspension. Nanoparticles can be formed before or after the anchoring agent is bonded to the support.

In one embodiment, dispersed catalyst nanoparticles form in the suspension, colloid, or solution. In an alternative embodiment, the dispersing agent facilitates the formation of nanoparticles as the active atoms are disposed on a support surface in one or more subsequent steps. Typically, active catalyst particles form in a reducing step. Suitable reducing techniques include bubbling hydrogen gas through the solution of dispersed catalyst atoms.

When forming catalyst nanoparticles, the catalyst atoms can be provided in any form so as to be soluble or dispersible in the solvent or carrier that is used to form the nanoparticles. For example, catalyst atoms can be provided as metal salts that are readily dissolvable in the solvent or carrier. It may be advantageous to use metal chlorides and nitrates, since metal chlorides and nitrates are typically more soluble than other metal salts. In an alternative embodiment, the metal can be provided in its non-ionic (i.e. metal) form. In this embodiment, the solvent or carrier typically includes an acid to help dissolve the metal.

The anchoring agent is added to the solvent or carrier in a manner so as to facilitate association of the dispersing agent with the catalyst atoms. Some anchoring agents may themselves be soluble in the solvent or carrier. In the case of anchoring agents that include carboxylic acid groups, it may be advantageous to form a metal salt of the acids (e.g., an alkali or alkaline earth metal salt). For example, polyacrylic acid can be provided as a sodium polyacrylate salt, which is both readily soluble in aqueous solvent systems and able to react with catalyst metal salts to form a metal-polyacrylate complex, which may be soluble or which may form a suspension within the solvent or carrier.

C. Bonding the Anchoring Agent to the Acid Functionalized Support Material

The anchoring agent is reacted with the acid functionalized support material to bond the anchoring agent to functional groups of the surface of the acid functionalized support. It is currently believed that the anchoring agent primarily bonds to the support through the inorganic acid functional groups. However, it is also possible for the anchoring agent to bond to other functional groups on the metal oxide support, such as through hydroxyl groups or by an acid displacing a halide group on the support.

Those skilled in the art will also recognize that even where the anchoring agent bonds to the inorganic acid functional groups, there may be any number of remaining acid functional groups that are available to give the supported catalyst desired properties.

In one aspect of the invention, the anchoring agent is selected to have particular functional groups for bonding the anchoring agent to the acid functionalized support material. For example, polyacrylic acid can be used for its carboxylic acid functional groups, which can react with an inorganic acid group on the functionalized support surface.

The anchoring agent can be reacted with the support material before or after reacting the anchoring agent with the catalyst atoms to form nanoparticles. In some cases, as mentioned above, reacting the anchoring agent with the support material can facilitate the formation of nanoparticles.

III. Supported Catalysts

The supported catalysts of the present invention include an acid functionalized support material and a plurality of supported active nanoparticles. An anchoring agent tethers the active nanoparticles to the support material to prevent leaching and/or agglomeration of the catalyst nanoparticles.

The functional groups of the anchoring agent bond to one or more of the atoms of the active nanoparticles and one or more functional groups on the surface of the acid functionalized support material. In an exemplary embodiment, the anchoring agent bonds to the inorganic acid functional groups on the surface of the metal oxide support.

Metal loadings of the catalyst component on the support material can vary depending on the intended use of the supported catalyst. In a preferred embodiment, the metal loading is between about 0.01% and about 10% by weight, and more preferably between about 0.05% and about 5% by weight. These loading amounts are useful for catalyst for direct synthesis of hydrogen peroxide, for example.

The anchoring agent can also be selected to promote the formation of catalyst particles that have a desired stability, size and/or uniformity. For example, the anchoring agent can be selected to promote formation of nanoparticle catalysts with a desired 110 or 111 crystal face exposure.

In a preferred embodiment, the anchoring agent is selected to form catalyst particles with a 110 crystal face exposure for manufacturing hydrogen peroxide. An example of a suitable anchoring agent for forming nanoparticles with selective 110 crystal face exposure is polyacrylic acid.

IV. Methods of Manufacturing Hydrogen Peroxide

The supported catalysts of the present invention are particularly advantageous for the direct synthesis of hydrogen peroxide from hydrogen and oxygen. In a preferred embodiment, hydrogen peroxide promoting catalysts manufactured according to the present invention include a combination of palladium and platinum. In addition, the catalyst nanoparticles can be controllably formed to have a 110 crystal face exposure. Suitable anchoring agent for producing catalyst nanoparticles with a 110 crystal face exposure include linear polymers or oligomers, such as lower molecular weight polyacrylic acid. (e.g., between about 300 to about 15,000 Daltons.

The catalyst of the present invention can be used in any type of reactor suitable for the direct synthesis of hydrogen peroxide. Suitable reactors include fixed bed, ebullated bed, and slurry reactors. In a preferred embodiment, the catalysts of the present invention is loaded into a fixed bed or ebullated bed reactor for hydrogen peroxide production. The use of the catalyst of the present invention in a fixed bed or ebullated bed reactor facilitates the recovery and regeneration of the catalyst.

To load the catalyst in a fixed bed or ebullated bed reactor, the supported catalyst is manufactured to have a size and/or shape suitable for a fixed bed or ebullated bed. For example, the supported catalyst can be manufactured into particulates such as beads or spheres that have a size suitable for use in a fixed bed or fluidized bed reactor. In an exemplary embodiment, the particulate has a nominal dimension of at least about 0.5 mm, and more preferably at least about 1 mm. Alternatively, the support material can be extruded to make a part with dimensions that are suitable for use in any size or shaped fixed bed reactor.

Extruding, crushing or otherwise shaping the support material for use in a particular type of reactor is typically done before anchoring the catalyst onto the support material such that the catalyst is distributed over substantially the entire support surface that is exposed in the reactor.

Once the supported catalyst is placed into a suitable reactor, hydrogen peroxide can be directly synthesized by introducing a feedstream of hydrogen gas and molecular oxygen. In an exemplary embodiment, hydrogen is introduced into the reactor in a concentration less than the flammability limit of hydrogen. The oxygen concentration preferably ranges from about 5% to about 97% by volume, more preferably from about 10% to about 80%, and most preferably from about 20% to about 60%. For concentrations of oxygen greater than about 25%, it is advantageous to use an inorganic support to avoid oxidation of the support.

The supported catalysts of the present invention have metal loadings and suitable activity for the efficient production of hydrogen peroxide at low hydrogen concentrations. Because the metal component of the catalyst material is anchored to the support material, the supported catalysts have extended life and are easily recovered and regenerated. For reactors such as fixed bed and fluidized bed reactors, the supported catalyst are particularly easy to recover, thereby reducing ongoing cost of hydrogen peroxide production.

The following examples are exemplary procedures for manufacturing supported catalyst according to the present invention and for manufacturing hydrogen peroxide using these catalysts. The catalyst precursor made using the procedure of Example 1 is used in Examples 2–5 to make supported catalyst according to the present invention. Examples 6–9 use the supported catalysts of 2–5, respectively, to manufacture hydrogen peroxide according to the present invention.

EXAMPLE 1

Preparation of Catalyst Precursor

In an exemplary embodiment, a catalyst precursor solution is prepared using the following procedure: a Palladium solution was prepared by dissolving 1.3339 g $PdCl_2$ in 4.76 g HCl, and then diluting to a total volume of 1000 ml using deionized water. A Platinum solution was prepared by mixing 0.2614 g $H_2PtCl_6$ with deionized water to form a solution with a total volume of 1000 ml. An anchoring agent solution was prepared by diluting 15 g of a 45 wt % aqueous solution of sodium polyacrylate (molecular weight=1200) to a total volume of 100 ml with deionized water.

The catalyst precursor solution was prepared by mixing 75 ml of the palladium solution, 12 ml of the platinum solution, and 10 ml of the anchoring agent solution, and then diluting the mixture to 1000 ml using deionized water. The mixture was then purged with nitrogen at 100 ml/min for 1.5 hr, and then fed with hydrogen at 100 ml/min for 30 minutes. The catalyst precursor complex within the solution was then ready for use.

EXAMPLE 2

Supported Catalyst

An acid functionalized catalyst support was prepared by grinding and sieving a silica gel (supplied by Alfa Aesar, catalog # 89346) to 20–40 mesh. 60 g of this sieved material was then mixed with 180 g toluene and 10 g of para-toluene sulfonic acid. This mixture was heated to the boiling point and refluxed for 30 minutes. Then, the excess toluene solution was drained and the solid dried. The solid was soaked in 100 g methanol for 15 minutes and then the excess methanol was drained.

To form the supported catalyst, the acid functionalized support material was mixed with the catalyst precursor solution of Example 1. The mixture was heated to boiling and stirred until 90% of the liquid was removed. The remaining mixture was then transferred to a rotating drier apparatus, where the remaining liquid was evaporated. Drying was then performed in a drying oven at 110° C. overnight.

The dried solid was then treated in a tubular reactor with hydrogen at 100 ml/min and 300° C. for 17 hr. After cooling, the solid was transferred to an oven, where it was heated to 150° C. for 3 hours under nitrogen atmosphere. The finished support had a catalyst loading of 0.1 wt % active metal (Pd and Pt).

EXAMPLE 3

Supported Catalyst

A catalyst support was prepared by grinding and sieving a silica gel (supplied by Alfa Aesar, catalog # 89346) to 20–40 mesh. 60 g of this sieved material was then mixed with 600 ml of a 10 wt % aqueous solution of HCl. This mixture was heated to boiling and refluxed for 90 minutes. The HCl solution was then drained, and the solids washed multiple times with deionized water until free of Cl. The washed solids were then mixed with 200 g of sulfuric acid and heated to 90° C. for 8 hours. The $H_2SO_4$ was then drained and the solids washed 5 times with water and then dried overnight in an oven at 110° C. The dried solid was then soaked in 100 g methanol for 15 minutes and the excess methanol drained.

The treated catalyst support was then mixed with 1000 ml of the catalyst precursor solution of Example 1 and further prepared according to Example 2. The finished supported catalyst contained 0.1 wt % active metal (Pd and Pt).

EXAMPLE 4

Supported Catalyst

The supported catalyst was prepared using Grade 57 silica gel, (Davicat SI1101, supplied by Grace Davison) at a approximate particle size of 1 mm. 60 g of this sieved material was mixed with 600 ml of a 10 wt % aqueous solution of HCl. This mixture was heated to boiling and refluxed for 90 minutes. The HCl solution was then drained and the solids washed multiple times with deionized water until free of Cl. The washed solids were then mixed with 200 g of sulfuric acid and heated to 90° C. for 8 hours. The $H_2SO_4$ was then drained, and the solids washed 5 times with water and then dried overnight in an oven at 110° C. The dried solid was then soaked in 100 g methanol for 15 minutes and the excess methanol drained.

The treated catalyst support was then mixed with 1000 ml of the catalyst precursor solution of Example 1, and further prepared as in Example 2. The finished supported catalyst contained 0.1 wt % active metal (Pd and Pt).

EXAMPLE 5

Supported Catalyst

The catalyst support was an extruded silica gel, supplied by Grace Davison (Davicat 1600) in the form of 1 mm diameter extrudates. The extrudates are crushed and sieved to a particle size of 20–40 mesh. 60 g of this sieved material was then mixed with 1000 ml of a 10 wt % aqueous solution of HCl. This mixture was heated to boiling and refluxed for 90 minutes. The HCl solution was then drained, and the solids washed 5 times with deionized water. The washed solids are then mixed with 200 g of sulfuric acid and heated to boiling with reflux for 1 hour. The $H_2SO_4$ was then drained, and the solids washed 5 times with water and then dried overnight in an oven at 110° C. The dried solid was then soaked in 100 g methanol for 15 minutes, then the excess methanol was drained.

The treated catalyst support was then mixed with 1000 ml of the catalyst precursor solution of Example 1. The catalyst was further prepared according to Example 2. The finished supported catalyst contained 0.1 wt % active metal (Pd and Pt).

EXAMPLE 6

Manufacture of Hydrogen Peroxide 6.4 g of the supported catalyst of Example 2 was packed into a vertical tubular fixed bed reactor of 10 mm inside diameter. A liquid feed consisting of methanol containing 650 ppm (by weight) of sulfuric acid and 15 ppm (by weight) of NaBr was fed to the bottom of the reactor at a total rate of 30 ml/hr.

A gas feed containing 3% hydrogen, 40% oxygen, and the balance inert gas was also fed to the bottom of the reactor at 1600 standard ml/min. Liquid and gas products were withdrawn from the top of the reactor. Liquid was analyzed for hydrogen peroxide concentration by permanganate titration, and the gas was analyzed by GC for hydrogen concentration. After 500 hours of continuous operation, the result was 10 wt % hydrogen peroxide in the liquid. Selectivity for hydrogen peroxide was 78% based on hydrogen converted and catalyst productivity was 420 g $H_2O_2$ produced/g active metal/hr.

EXAMPLE 7

Manufacture of Hydrogen Peroxide 2.84 g of the supported catalyst of Example 3 was charged into the fixed bed reactor of Example 6, and operated under the same conditions as Example 6. After 50 hours of continuous operation, the results were 6.4 wt % hydrogen peroxide in the liquid and selectivity for hydrogen peroxide of 75%, based on hydrogen converted. Catalyst productivity was 700 g $H_2O_2$ produced/g active metal/hr.

EXAMPLE 8

Manufacture of Hydrogen Peroxide 3.96 g of the supported catalyst of Example 4 was charged into the fixed bed reactor of Example 6, and operated under the same conditions as Example 6. After 40 hours of continuous operation, the results were 7.0 wt % hydrogen peroxide in the liquid and selectivity for hydrogen peroxide of 74%, based on hydrogen converted. Catalyst productivity was 575 g $H_2O_2$ produced/g active metal/hr.

EXAMPLE 9

Manufacture of Hydrogen Peroxide 4.30 g of the supported catalyst of Example 5 was charged into the fixed bed reactor of Example 6, and operated under the same conditions as Example 6. After 150 hours of continuous operation, the results were 6.2 wt % hydrogen peroxide in the liquid, selectivity to hydrogen peroxide of 73% based on hydrogen converted, and a catalyst productivity of 500 g $H_2O_2$ produced/g active metal/hr.

While the foregoing examples illustrate the effectiveness of manufacturing hydrogen peroxide according to the present invention, the supported catalyst and methods of the present invention are not so limited. Catalyst manufactured according to the present invention can be used in many different procedures where efficient catalysts with low levels of leaching are desired and/or where the supported catalyst needs to be desirably shaped for use in a reactor.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A supported, anchored catalyst comprising:
   a plurality of active catalyst particles;
   a functionalized support material comprising a solid metal oxide support material having a plurality of inorganic acid functional groups bonded thereto, wherein the inorganic acid functional groups are provided by at least one acid selected from the group consisting of sulfuric acid, nitric acid, phosphoric acid, and derivatives thereof; and
   a plurality of organic anchoring agent molecules bonded to the plurality of inorganic acid functional groups and to the plurality of active catalyst particles such that the catalyst particles are anchored to and supported by the functionalized support material.

2. A supported catalyst as in claim 1, wherein at least a portion of the inorganic acid functional groups comprise sulfonic groups.

3. A supported catalyst as in claim 1, wherein at least a portion of the inorganic acid functional groups comprise at least one member selected from the group consisting of nitric groups and phosphonic groups.

4. A supported catalyst as in claim 1, wherein the metal oxide comprises at least one member selected from the group consisting of silica, alumina, zeolites, titania, zirconia and magnesia.

5. A supported catalyst as in claim 1, wherein the support material comprises at least one member selected from the group consisting of granules, beads, spheres, and extrudates.

6. A supported catalyst as in claim 1, wherein the support material has a surface area in a range of about 50 $m^2/g$ to about 1000 $m^2/g$.

7. A supported catalyst as in claim 1, wherein the support material has a surface area in a range of about 100 $m^2/g$ to about 500 $m^2/g$.

8. A supported catalyst as in claim 1, wherein the catalyst particles have a diameter of less than about 100 nm.

9. A method of manufacturing hydrogen peroxide, comprising:
   placing the supported catalyst of claim 1 in a reactor; and
   introducing a hydrogen feedstream and an oxygen feedstream into the reactor and catalyzing the production of hydrogen peroxide in the presence of the supported catalyst.

10. A method as in claim 9, wherein the reactor is a fixed bed or ebullated bed reactor.

11. A method as in claim 10, wherein the support material is a particulate having a size of at least about 0.5 mm.

12. A method as in claim 10, wherein the support material is a particulate having a size of at least about 1 mm.

13. A method of manufacturing a supported catalyst comprising:
   (i) reacting a solid metal oxide support material with an inorganic acid containing agent to form an acid functionalized support material, the inorganic acid containing agent comprising at least one member selected from the group consisting of sulfuric acid, nitric acid, phosphoric acid, and derivatives thereof;
   (ii) providing a plurality of catalyst atoms;
   (iii) providing an anchoring agent comprising a plurality of organic molecules having at least one functional group capable of binding to the catalyst atoms; and
   (iv) reacting the anchoring agent, the catalyst atoms, and the acid functionalized support material to form a plurality of catalyst particles, wherein the anchoring agent bonds to the acid functionalized support material to anchor the catalyst particles thereto.

14. A method as in claim 13, wherein the inorganic acid containing agent comprises at least one member selected from the group consisting of sulfuric acid and derivatives thereof.

15. A method as in claim 13, wherein the anchoring agent comprises polyacrylic acid.

16. A method as in claim 13, wherein the catalyst atoms and the anchoring agent are reacted prior to bonding the anchoring agent to the acid functionalized support material.

17. A method as in claim 13, wherein the anchoring agent is bonded to the acid functionalized support material prior to reacting the anchoring agent with the catalyst atoms.

18. A method as in claim 13, wherein the acid functionalized support is manufactured by treating the solid support with an activating agent prior to reacting the support material with an inorganic acid containing compound.

19. A method as in claim 18, wherein the activating agent comprises a hydrogen halide.

20. A method as in claim 13, wherein the metal oxide comprises at least one member selected from the group consisting of silica, alumina, zeolites, titania, zirconia, and magnesia.

21. A supported, anchored catalyst, comprising:

a plurality of active catalyst nanoparticles having a size less than about 100 nm;

an acid functionalized support material comprising at least 50% of a metal oxide;

a plurality of sulfonic functional groups bonded to the support material; and a plurality of organic anchoring agent molecules bonded to the plurality of sulfonic functional groups and to the plurality of active catalyst particles such that the catalyst particles are anchored to and supported by the acid functionalized support material.

22. A supported catalyst as in claim 21, wherein the support material comprises at least one member selected from the group consisting of granules, beads, spheres, and extrudates.

23. A supported catalyst as in claim 21, wherein the metal oxide comprises silica.

24. A supported catalyst as in claim 23, wherein the silica comprises at least 90% of the support material.

25. A supported catalyst as in claim 21, wherein the anchoring agent comprises polyacrylic acid.

26. A method of manufacturing hydrogen peroxide, comprising:
placing the supported catalyst of claim 21 in a fixed bed or ebullated bed reactor; and
introducing a hydrogen feedstream and an oxygen feedstream into the reactor and catalyzing the production of hydrogen peroxide in the presence of the supported catalyst.

27. A method as in claim 26, wherein the hydrogen feedstream has a concentration below the flammability limit.

28. A method as in claim 26, wherein the oxygen feedstream has an oxygen concentration greater than about 25%.

29. A supported, anchored catalyst comprising:
a plurality of active nanocatalyst particles having a particle size less than about 100 nm;
an acid functionalized support material comprising silica having a plurality of inorganic acid functional groups bonded thereto derived from at least one acid selected from the group consisting of sulfuric acid, nitric acid, phosphoric acid, and derivatives thereof; and
a plurality of organic anchoring agent molecules bonded to the plurality of inorganic acid functional groups and to the plurality of active nanocatalyst particles such that the nanocatalyst particles are anchored to and supported by the acid functionalized support material.

* * * * *

UNITED STATES PATENT AND TRADEMARK OFFICE
CERTIFICATE OF CORRECTION

PATENT NO. : 7,045,481 B1  
APPLICATION NO. : 11/103824  
DATED : May 16, 2006  
INVENTOR(S) : Parasher et al.

Page 1 of 1

It is certified that error appears in the above-identified patent and that said Letters Patent is hereby corrected as shown below:

Title Page  
Page 2, Item 56, References Cited, Other Publications, Lordi et al., line 2, change "hydrogenation" to --Hydrogenation--

Column 3  
Line 18, change "catalyst" to --catalysts--

Column 6  
Line 53, after "polypyridine," insert --and--

Signed and Sealed this

Ninth Day of January, 2007

JON W. DUDAS  
*Director of the United States Patent and Trademark Office*